(12) United States Patent
Vincent

(10) Patent No.: US 11,509,411 B2
(45) Date of Patent: Nov. 22, 2022

(54) METHOD AND SYSTEM FOR CORRECTING CLOCK SKEW USING PRECISION TIME PROTOCOL

(71) Applicant: Wipro Limited, Bangalore (IN)

(72) Inventor: Jimmy Vincent, Ammadam (IN)

(73) Assignee: Wipro Limited, Bangalore (IN)

( * ) Notice: Subject to any disclaimer, the term of this patent is extended or adjusted under 35 U.S.C. 154(b) by 93 days.

(21) Appl. No.: 16/825,180

(22) Filed: Mar. 20, 2020

(65) Prior Publication Data
US 2021/0297174 A1 Sep. 23, 2021

(30) Foreign Application Priority Data
Mar. 18, 2020 (IN) .............................. 202041011594

(51) Int. Cl.
| | | |
|---|---|---|
| *H04J 3/06* | (2006.01) | |
| *G06F 1/10* | (2006.01) | |
| *G06F 1/12* | (2006.01) | |
| *G06F 1/14* | (2006.01) | |
| *H04L 69/28* | (2022.01) | |
| *H04L 43/0852* | (2022.01) | |

(52) U.S. Cl.
CPC ............. *H04J 3/0667* (2013.01); *G06F 1/10* (2013.01); *G06F 1/12* (2013.01); *G06F 1/14* (2013.01); *H04J 3/067* (2013.01); *H04L 69/28* (2013.01); *H04L 43/0852* (2013.01)

(58) Field of Classification Search
CPC ........... H04J 3/0667; H04J 3/067; G06F 1/10; G06F 1/12; G06F 1/14; H04L 69/28; H04L 43/0852
See application file for complete search history.

(56) References Cited

U.S. PATENT DOCUMENTS 7,821,958 B2 10/2010 Smith et al.
8,873,589 B2 10/2014 Aweya et al.
(Continued)

OTHER PUBLICATIONS

Hamilton, B., et al., "ACES: Adaptive Clock Estimation and Synchronization Using Kalman Filtering", MobiCom'08, Sep. 14-19, 2008, pp. 152-162 (11 pages).

*Primary Examiner* — Walter J Divito
*Assistant Examiner* — Anthony Luo
(74) *Attorney, Agent, or Firm* — Finnegan, Henderson, Farabov, Garrett & Dunner, LLP

(57) ABSTRACT

The disclosure relates to method and system for correcting a clock skew in a slave device using a precision time protocol (PTP). The method includes determining an uplink delay and a downlink delay, based on at least two packet transactions in the PTP protocol and conducted between the slave device and a master device within a pre-defined accumulator time window. The method further includes determining a change in the uplink/downlink delay with respect to a reference uplink/downlink delay. The reference uplink/downlink delay correspond to a first pre-defined accumulator time window at a start of the slave device, or to a last pre-defined accumulator time window during a previous correction of the clock skew. The method further includes correcting the clock skew upon determining the change in the uplink delay to be about same in magnitude as and to be in opposite direction to the change in the downlink delay.

17 Claims, 7 Drawing Sheets

(56) References Cited

U.S. PATENT DOCUMENTS

| | | | |
|---|---|---|---|
| 2011/0311012 A1* | 12/2011 | Chen | H03L 7/087 |
| | | | 375/376 |
| 2014/0179250 A1* | 6/2014 | Shute | H03F 3/24 |
| | | | 455/127.2 |
| 2015/0092794 A1* | 4/2015 | Aweya | H04J 3/0667 |
| | | | 370/503 |
| 2016/0211936 A1* | 7/2016 | Bottari | H04L 41/12 |
| 2021/0218224 A1* | 7/2021 | Dyer | G01N 21/6408 |

* cited by examiner

METHOD AND SYSTEM FOR CORRECTING CLOCK SKEW USING PRECISION TIME PROTOCOL

TECHNICAL FIELD

This disclosure relates generally to clock synchronization, and more particularly to method and system for correcting clock skew using precision time protocol (PTP).

BACKGROUND

Communication network involving multiple devices often require accurate and synchronized timing, for example to facilitate event synchronization and data correlation. An asynchronous clock in a network device may happen due to various factors and may adversely impact proper functioning of the network device. For example, the asynchronous clock in the network device may result in packet loss, delay in data transmission/reception, and so forth. Synchronization of time is therefore important and may involve eliminating or minimizing a clock skew in the network device.

As will be appreciated, there are many techniques employed by a communication network (e.g., 4G, 5G backhaul and fronthaul, etc.) to perform time synchronization for multiple devices. One such technique may involve Precision Time Protocol (PTP) synchronization (sync) mode to keep time, phase and frequency synchronized across devices (e.g., IoT devices, medical devices, power grids, etc.) in the communication network. Typically, the PTP sync is achieved between a master device and a slave device by: a) the master device dynamically sharing an accurate time information with the slave device, b) the slave device dynamically determining a Round Trip Time (RTT) or path delay (PD) with the master device at regular intervals, and c) the slave device setting/adjusting an appropriate time based on the time received from master device and the RTT/PD determined by the slave device. The setting/adjusting of the time may be performed with the help of an PTP-Daemon (PTP-d) and PTP-servo running at the slave device. As will be appreciated, typically, the slave device has a cheaper or less accurate device clock, which deviates much with respect to the master device. This clock deviation (also referred to as clock skew) is primarily caused due to ageing and temperature effects on slave clock. Thus, for the device synchronization, only the time error due to the clock skew at the slave device should be adjusted by the PTP-d running at the slave device.

It may be critical for the PTP-d running at the slave device to accurately determine the RTT/PD, so as to set the accurate time at the slave device. However, due to network variations (i.e., network congestion, network disruptions, etc.) between the master and the slave device, accurate determination of the RTT/PD is challenging. In other words, the RTT/PD varies from time to time due to two main factors: a) network variations (NV) that may result in packet delay variations (PDVs), and b) clock deviation at the slave device. The clock correction in the slave device should be based on clock deviation/skew only and not on network congestion/disruptions. Hence, there is a need to isolate clock deviation/skew and to eliminate the PDVs from the RTT/PD determination, caused due to the network disruption/congestion, before determining the time adjustments required at the slave device. In short, the network variations must be considered or accounted for prior to setting/adjusting the time at the slave device.

As will be appreciated, many of the existing techniques does not have a deterministic mechanism to detect an instantaneous clock deviation/skew based on uplink and downlink path delays of PTP packets. Additionally, these existing techniques detects the instantaneous clock deviation/skew by determining variations in either uplink or downlink path delays. Further, none of the existing techniques effectively filter-out the variations in the RTT/PD caused due to the dynamic network variations during instantaneous clock deviation/skew correction. Therefore, there is a need of a mechanism that may dynamically detect variations in the path delays based on the instantaneous clock deviation/skew so as to determine an exact time to be adjusted at the slave device due to clock deviation.

SUMMARY

In one embodiment, a method of correcting a clock skew of a clock in a slave device using a precision time protocol (PTP) is disclosed. In one example, the method may include determining an uplink delay and a downlink delay, based on at least two packet transactions in the PTP protocol and conducted between the slave device and a master device within a pre-defined accumulator time window. The method may further include determining a change in the uplink delay and a change in the downlink delay with respect to a reference uplink delay and a reference downlink delay respectively. It should be noted that the reference uplink delay and the reference downlink delay correspond to a first pre-defined accumulator time window at a start of the slave device, or to a last pre-defined accumulator time window during a previous correction of the clock skew. The method may further include correcting the clock skew upon determining the change in the uplink delay to be about same in magnitude as and to be in opposite direction to the change in the downlink delay.

In another embodiment, a system for correcting a clock skew of a clock in a slave device using a precision time protocol (PTP) is disclosed. In one example, the system may include a processor and a memory communicatively coupled to the processor, wherein the memory stores processor-executable instructions, which, on execution, may cause the processor to determine an uplink delay and a downlink delay, based on at least two packet transactions in the PTP protocol and conducted between the slave device and a master device within a pre-defined accumulator time window. The processor-executable instructions, on execution, may further cause the processor to determine a change in the uplink delay and a change in the downlink delay with respect to a reference uplink delay and a reference downlink delay respectively. It should be noted that the reference uplink delay and the reference downlink delay correspond to a first pre-defined accumulator time window at a start of the slave device, or to a last pre-defined accumulator time window during a previous correction of the clock skew. The processor-executable instructions, on execution, may further cause the processor to correct the clock skew upon determining the change in the uplink delay to be about same in magnitude as and to be in opposite direction to the change in the downlink delay.

In yet another embodiment, a non-transitory computer-readable storage medium, storing computer-executable instructions, for correcting a clock skew of a clock in a slave device using a precision time protocol (PTP) is disclosed. The stored instructions, when executed by a processor, may cause the processor to perform operations including determining an uplink delay and a downlink delay, based on at least two packet transactions in the PTP protocol and conducted between the slave device and a master device within a pre-defined accumulator time window. The operations further include determining a change in the uplink delay and a change in the downlink delay with respect to a reference uplink delay and a reference downlink delay respectively. It should be noted that the reference uplink delay and the reference downlink delay correspond to a first pre-defined accumulator time window at a start of the slave device, or to a last pre-defined accumulator time window during a previous correction of the clock skew. The operations further include correcting the clock skew upon determining the change in the uplink delay to be about same in magnitude as and to be in opposite direction to the change in the downlink delay.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1A:
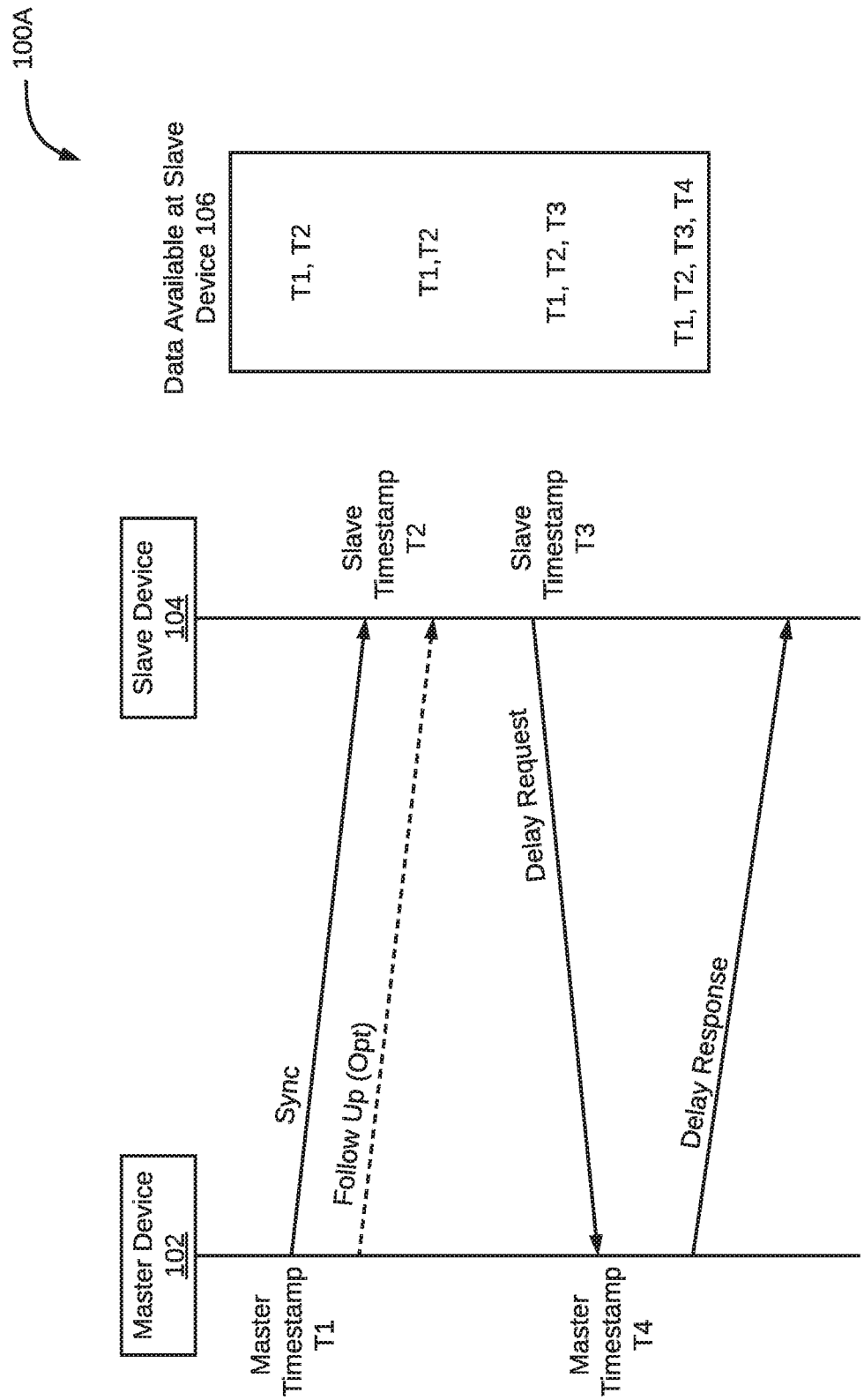
FIG. 1A illustrates an exemplary mechanism for recording timestamps for precision time protocol (PTP) packet transactions conducted between a master device and a slave device, in accordance with some embodiments of the present disclosure.

Referring now to FIG. 1A, an exemplary mechanism 100A for recording timestamps for precision time protocol (PTP) packet transactions conducted between a master device 102 and a slave device 104 is illustrated, in accordance with some embodiments of the present disclosure. In particular, the mechanism 100A represents timestamps recorded by the slave device 104 for each PTP packet transaction between the master device 102 and the salve device 104. It should be noted that each PTP packet transaction may include transmission of a synchronization (sync) packet (also referred to as sync message), a delay request packet (also referred to as delay request), and a delay response packet (also referred to as delay response) between the master device 102 and the slave device 104. Further, it should be noted that timestamps for many such PTP packet transactions may be recorded by the slave device 104.

As stated above, each PTP packet transaction may involve a sequence of three steps. A first step may involve receiving, by the slave device 104, a sync packet at a second timestamp T2 that is sent from the master device 102 at a first timestamp T1. Thus, based on the received sync packet, the slave device 104 may become aware of the timestamps T1 and T2. The slave device 104 may then generate a delay request packet in response to the receiving of the sync packet. A second step may involve sending, by the slave device 104 at a third timestamp T3, the delay request packet to the master device 102. The master device 102 may receive the delay request packet at a fourth timestamp T4 and may generate, in response, a delay response packet with the T4 information. A third step may involve receiving, by the slave device 104, the delay response packet (with the T4 information) that is sent from the master device 102. Thus, based on the delay request packet and the delay response packet, the slave device 104 may become aware of the timestamps T3 and T4. The timestamps T1, T2, T3, and T4 available at the slave device 104 may be represented by a block 106 and may be stored by the slave device 104. As will be described in detail below, this data (i.e., the timestamps T1, T2, T3, and T4) for at least two such PTP packet transactions conducted within a pre-defined accumulator time window may enable the slave device 104 to determine an uplink delay (also referred as uplink packet delay (UPD)) and a downlink delay (also referred as downlink packet delay (DPD)). The pre-defined accumulator time window may correspond to an accumulated window period (AWP).

Figure 1B:
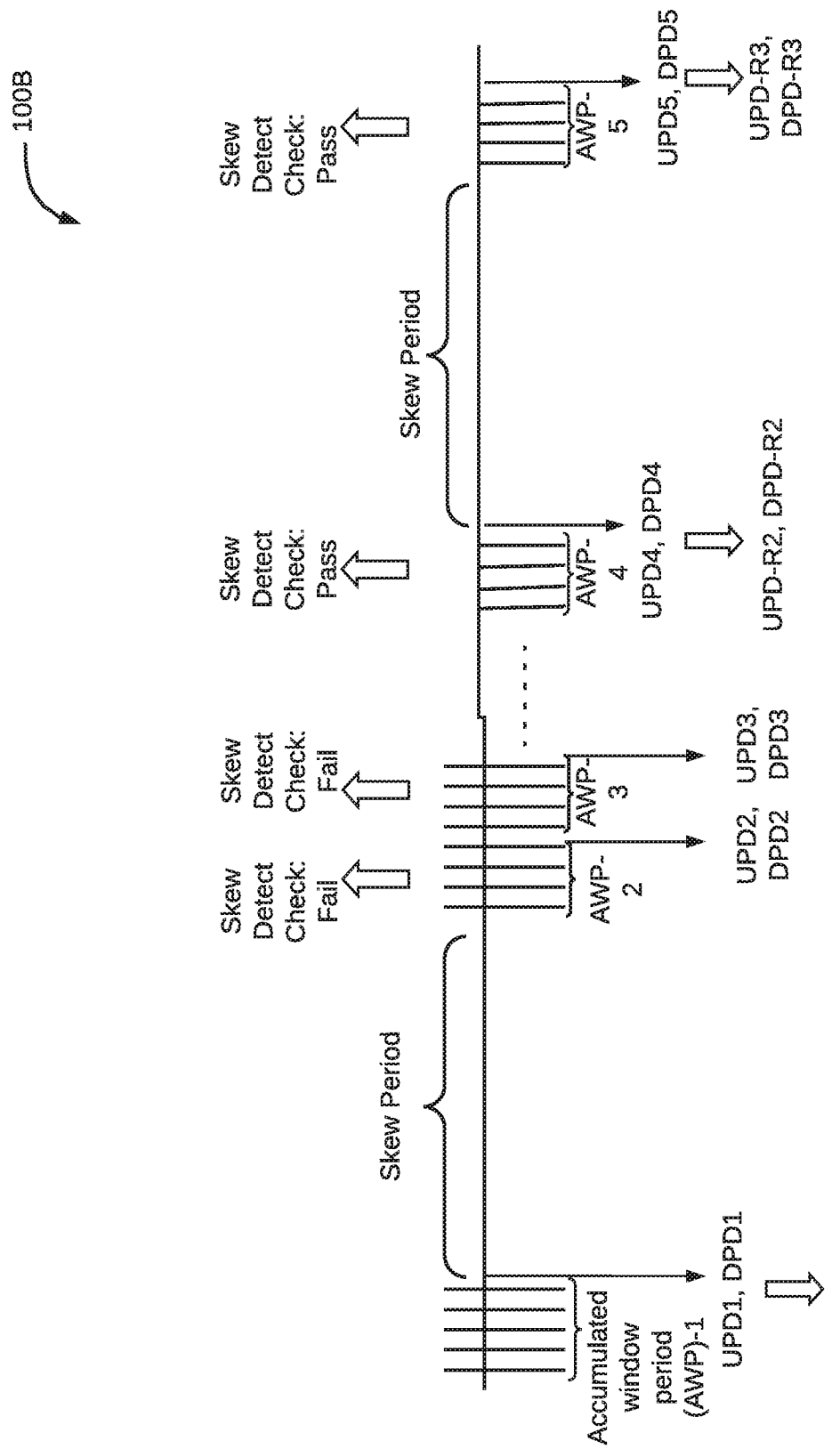
FIG. 1B illustrates an exemplary mechanism for correcting a clock skew in the slave device based on a change in the uplink delay and a change in the downlink delay, in accordance with some embodiments of the present disclosure.

Referring now to FIG. 1B, an exemplary mechanism 100B for correcting a clock skew in the slave device 104 based on a change in the uplink delay and a change in the downlink delay is illustrated, in accordance with some embodiments of the present disclosure. In particular, the mechanism 100B may provide for a detection and a correction of the clock skew of the clock in the slave device 104 at a periodic interval (also referred to as pre-defined skew time window) based on the uplink delay and the downlink delay, which may be determined for at least two PTP packet transactions conducted between the master device 102 and the slave device 104 in one or more AWPs. In order to correct the clock skew, the mechanism 100B may dynamically determine a change in the uplink delay and a change the downlink delay with respect to a reference uplink delay and a reference downlink delay, for one or more AWPs until the clock skew is corrected. Thus, in order to detect the change in the uplink delay and the change in the downlink delay, the reference uplink delay and the reference downlink delay may be determined. The reference uplink delay and the reference downlink delay may initially correspond to an uplink delay and a downlink delay that is determined in a first AWP at a start of the slave device 104. Further, the reference uplink delay and the reference downlink delay may be updated with an uplink delay and a downlink delay in a last AWP after each correction of the clock skew. In other words, the reference uplink/downlink delay for a given correction cycle may correspond either to the uplink/downlink delay in the first AWP at the start of the slave device 104 or to the uplink/downlink delay in the last AWP during a previous correction of the clock skew. It should be noted that, in order to correct the clock skew, the change in the uplink delay should be about same in magnitude as and should be in opposite direction to the change in the downlink delay. Thus, only similar variation in the uplink delay and the downlink delay may be considered. In other words, any dissimilar variations in the uplink delay and the downlink delay may be filtered out and ignored, thereby avoiding any unexpected impacts on the uplink/downlink delays that may be caused due to network congestion. As stated above, the change in the uplink delay and the downlink delay should be in opposite directions. Thus, if the change in the uplink delay is positive than the change in the downlink delay should be negative (i.e., the uplink delay=(−) the downlink delay) and vice versa.

As stated above, the change in the uplink delay and the change in the downlink delay may be determined for the one or more AWPs until the clock skew is corrected. Further, the clock skew itself may be corrected after an elapse of a pre-defined time period. This pre-defined time period may also be referred to as the pre-defined skew time window. The pre-defined skew time window may correspond to a minimum time period to be awaited in order to detect and correct the clock skew of the clock in the slave device 104. The pre-defined skew time window may depend upon an accuracy of the clock in the slave device 104. In other words, the pre-defined skew time window may be determined and configured based on an accuracy of the clock as defined by a specification of the clock. It should be noted that, the accuracy of the clock may be provided as a part of clock specifications by a clock vendor (manufacturer) and may vary from one clock to another. Thus, capability (i.e., accuracy) of the clock in the slave device 104 may be considered as an important factor for detecting/correcting the clock skew. It should be noted that, the higher is the accuracy of the clock, the longer is the pre-defined skew time window and vice versa.

In the illustrated embodiment, during the start of the slave device 104, an uplink delay (i.e., UPD1) and a downlink delay (i.e., DPD1) may be determined based on the timestamps T1, T2, T3, and T4 generated for at least two packet transactions in a first pre-defined accumulator time window (i.e., AWP-1). The UPD1 and the DPD1 may be stored as the reference uplink delay (i.e., UPD-R1) and the reference downlink delay (i.e., DPD-R1). It should be noted that, during start of the slave device 102, any reference uplink delay and reference downlink delay may not be present. Thus, the uplink/downlink delay in the first AWP may be stored as the reference uplink/downlink delay. Thereafter, the slave device 104 may wait for the skew period to perform clock skew correction. The slave device 104 may determine a second uplink delay (i.e., UPD2) and a second downlink delay (i.e., DPD2) based on at least two PTP packet transactions in a second AWP (i.e., AWP-2) which starts after expiry of the skew period. Based on determining the UPD2 and the DPD2, the change in the uplink delay and the change in the downlink delay may be determined. The change in the uplink packet delay may be determined based on a difference of the UPD2 and the UPD-R1. Similarly, the change in the downlink may be determined based on a difference of the DPD2 and the DPD-R1. The change in the uplink packed delay may also be referred to as a delta uplink delay (i.e., UPD-d). Similarly, the change in the downlink delay may be referred to as a delta downlink delay (i.e., DPD-d).

Based on the change in the uplink delay and the change in the downlink delay, the slave device 104 may perform a skew detection check. In particular, the skew detection check may be performed by comparing a magnitude and a direction of the change in the uplink delay and that of change in the downlink delay. The check passes only if the change in the uplink delay may be about same in magnitude as and may be in opposite direction to the change in the downlink delay. As stated above, when the skew detection check fails for a given AWP, the slave device 104 may iteratively determine the change in the uplink delay and the change in the downlink delay for the next AWP, until the skew detection check passes. In the illustrated embodiment, the skew detection check fails for the AWP-2 and AWP-3 but passes for AWP-4. In other words, for the AWP-4, the change in the uplink delay is about same in magnitude as and is in opposite direction to the change in the downlink delay. Once the skew detection check passes, the slave device 104 may correct the clock skew of the clock in the slave device 104. The clock skew may be corrected by determining a clock skew value that may be required to correct the clock of the slave device 104. In some embodiments, the clock skew value may be determined based on based on the change in the uplink delay or the change in the downlink delay. The clock skew value may be used to determine a voltage corresponding to the clock skew value. Based on the voltage determined, a frequency change may be determined for adjusting the clock skew of the clock in the slave device 104. Once the clock skew is corrected the UPD4 and the DPD4 may be stored as an updated uplink reference delay (i.e., UPD-R2) and an updated downlink reference delay (i.e., DPD-R2). Thus, the UPD-R2 and the DPD-R2 may be used for determining the change in uplink/downlink delay in the upcoming clock skew correction cycle after waiting for the skew period. In the illustrated embodiment, the skew detection check (performed after the skew period) may pass for AWP-5 (i.e., the change in the uplink delay may be about same in magnitude as and may be in opposite direction to the change in the downlink delay. It should be noted that, for the AWP-5, the change in the uplink delay may be determined based on a difference of the UPD5 and the UPD-R2. Similarly, for the AWP-5, the change in the downlink delay may be determined based on a difference of the DPD5 and DPD-R2. The clock skew of the clock in the slave device 104 may be then corrected based on the change in the uplink delay or the change in the downlink delay for AWP-5. After correcting the clock skew, the UPD5 and the DPD5 may be stored as an updated reference uplink delay and as an updated reference downlink delay for upcoming clock skew correction cycle.

Figure 2:
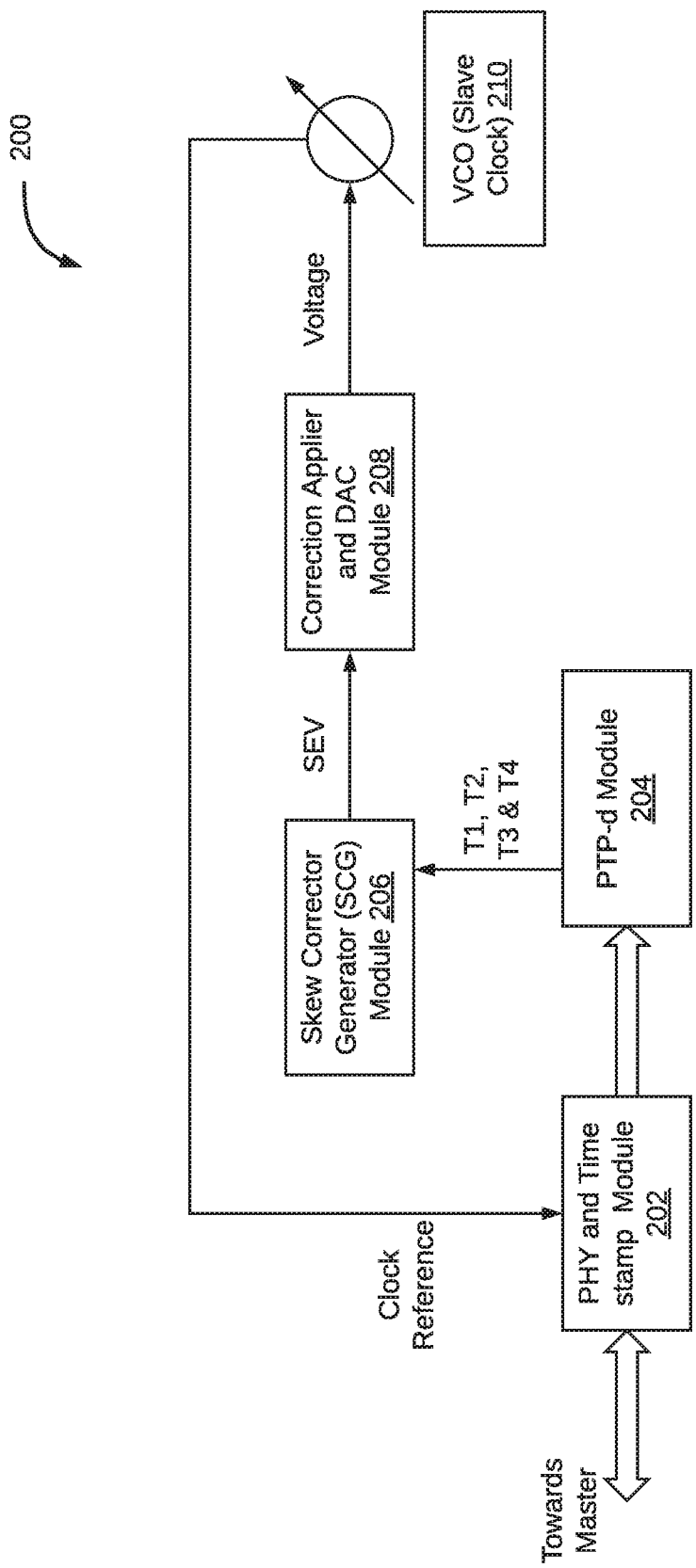
FIG. 2 is a functional block diagram of an exemplary slave device for correcting a clock skew of its clock using PTP, in accordance with some embodiments of the present disclosure.

Referring now to FIG. 2, a functional block diagram of an exemplary slave device 200 for correcting a clock skew of its clock using PTP is illustrated, in accordance with some embodiments of the present disclosure. The slave device 200 may include a PHY and timestamp module 202, a PTP-d module 204, a skew correction generator (SCG) module 206, a correction applier and digital to analog convertor (DAC) module 208, and a slave clock and voltage controlled oscillator (VCO) 210.

The PHY and timestamp module 202 may act as a physical layer interface that may be responsible to coordinate with peer for each of a packet termination. The major functionality of the PHY and timestamp module 202 may involve sending and receiving PTP packets though a physical medium, and may further involve timestamping of PTP packets. In particular, the PHY and timestamp module 202 may include a PHY module and a timestamp module. The PHY module may act as the physical medium to send and receive the PTP packets over IP/Ethernet protocol stack. Additionally, the timestamp module may timestamp each of the PTP packets in the PTP packet transactions. The time stamping by the PHY and timestamp module 202 may be based on a timestamp counter run by the device clock (e.g., clock of the slave device 104). In an embodiment, at the slave device 104, the PHY and timestamp module 202 may timestamp the PTP sync packets while receiving it. Each of the sync packets itself may contain timestamp information recorded by the PHY and timestamp module in the master device 102 at the time of sending the sync packets. Thus, by way of an example, the slave device 104 may become aware of the timestamps T1 and T2 for each of the sync packets. Similarly, the PHY and timestamp module 202 may also timestamp the PTP delay request packets while sending it to the master device 102. At the master device 102, the PHY and timestamp module may timestamp each of the delay request packets while receiving it. The master device 102 may then send PTP delay response packets that may contain timestamp information recorded by the PHY and timestamp module in the master device 102 at the time of receiving the delay request packets. Thus, by way of an example, the slave device 104 may become aware of the timestamps T3 and T4 for each of the delay request packets upon receiving the delay response packets. Example of the PHY and timestamp module 202 may include, but is not limited to, Ethernet PHY device such as from BROADCOMM®.

The PTP-d module 204 may act as a PTP protocol stack at the slave device 104. The PTP-d module 204 may compose egress PTP packets (i.e., the delay packets) and may parser ingress packets (i.e., the sync packets) based on IEEE® 1588v2. It should be noted that, in any existing general implementations there may be one or more PTP transactions happing in a second. Additionally, number of PTP packets send per second may be configurable. The PTP-d servo module 204 may than retrieve the timestamps T2 and T3 from the timestamp module of the PHY and timestamp module 202. In addition, the PTP-d servo module 204 may retrieve the timestamps T1 and T4 from the PTP sync and delay packets. Thereafter, the retrieved timestamps T1, T2, T3, and T4 may be provided to the SCG module 106.

The SCG module 206 may correct the clock skew (i.e., the change in clock frequency) in the clock of the slave device 104 (also referred to as save clock or VCO 210). By way of an example, the clock skew may correspond to a deviation in the slave clock. Based on the clock skew determined, the SCG module 206 may detect a skew error value (SEV) for the slave device 104. The SEV may correspond to the clock skew value that needs to be adjusted at the slave clock. As will be described in greater detail below, in some embodiments, the SEV may be determined based on change in path delay (i.e., DPP-d or UPD-d) with respect to reference path delay. Thereafter, the detected SEV is send to the correction applier and DAC module 208 for correcting the clock skew of the clock of the slave device 104. The SCG module 206 may include various sub-modules for correcting the clock skew in the clock of the slave device 104, which will be explained in greater detail in conjunction with FIG. 3.

The correction applier and DAC module 208 may generate a voltage corresponding to the clock skew value determined. To generate the voltage, the correction applier and DAC module 208 may generate required DAC steps. Moreover, based on a DAC function, the DAC steps may be converted for generating the voltage towards the VCO 210. It should be noted that, the DAC steps may be generated based on the clock skew value determined and granularity of a specific DAC. Further, based on the voltage generated, the correction applier and DAC module 208 may adjust a frequency of the VCO 210. In an embodiment, the voltage generated may be provide as an input to the VCO 210. The VCO 210 may then adjust itself based on the input voltage.

Figure 3:
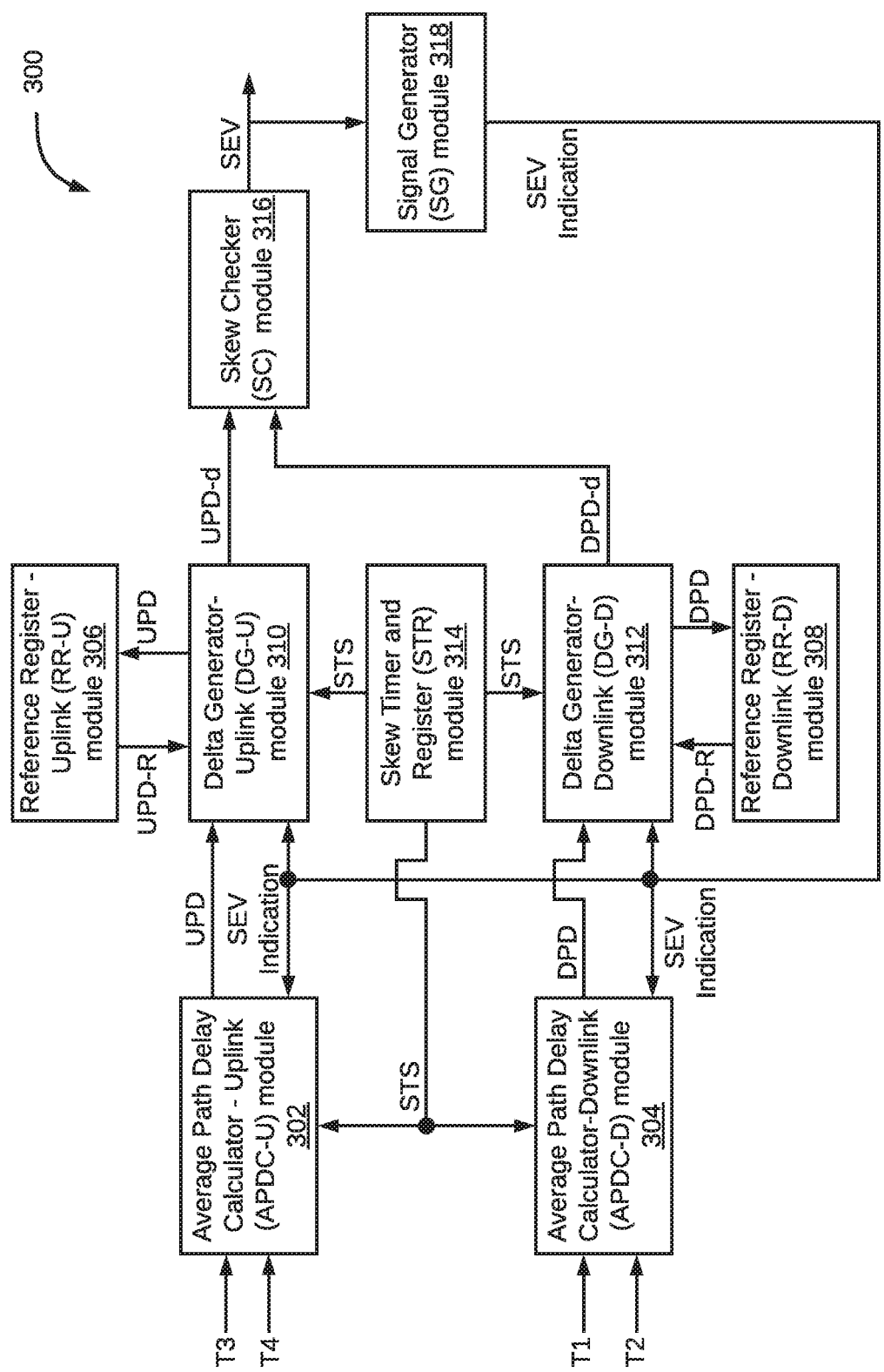
FIG. 3 is a functional block diagram of a skew controller generator of the slave device of FIG. 2, in accordance with some embodiments of the present disclosure.

Referring now to FIG. 3, a functional block diagram of a skew controller generator (SCG) module 300 (analogous to the SCG module 206 of FIG. 2) is illustrated, in accordance with some embodiments of the present disclosure. The SCG module 300 may include an average path delay calculator—uplink (APDC-U) module 302, an average path delay calculator—downlink (APDC-D) module 304, a reference register—uplink (RR-U) module 306, a reference register—downlink (RR-D) module 308, a delta generator—uplink (DG-U) module 310, a delta generator—downlink (DG-D) module 312, a skew timer and register (STR) module 314, a skew checker (SC) module 316, a signal generator (SG) module 318.

The APDC-U module 302 may accumulate the timestamps T3 and T4 from the PTP-d module 204 for the pre-defined accumulator time window. The pre-defined time window may correspond to the AWP. Additionally, the pre-defined accumulator time window may be preconfigured by a user. The APDC-U 302 module may then calculate the uplink delay based on at least two transactions at end of each of the AWP. For calculating the uplink delay, the APDC-U module 302 may determine an accumulated timestamp value [T3(AWP)] and an accumulated timestamp value [T4(AWP)] of at least two packet transactions. The accumulated timestamp value [T3(AWP)] may be determined based on an accumulated T3 value over the AWP divided by total T3 timestamps that may happen during that AWP. Similarly, the accumulated timestamp value [T4(AWP)] may be determined based on an accumulated T4 value over the AWP divided by total T4 timestamps that may happen during that AWP. In reference to FIG. 1, the accumulated timestamp value [T3(AWP)] and [T4(AWP)] may correspond to the timestamp T3 and T4. Based on the accumulated timestamp value [T3(AWP)] and the accumulated timestamp value [T4(AWP)], the APDC-U module 302 may calculate the uplink delay, as represented by an equation (1) below:

$$\text{Uplink Delay}(UPD) = [T4(AWP)] - [T3(AWP)] \quad (1)$$

The APDC-U module 302 may then update its internal register (i.e. the RR-U module 306) based on the uplink delay calculated. In addition, the APDC-U module 302 may receive a skew timer signal from the STR module 314. The skew timer signal may happen after the skew period. By way of an example, the skew timer signal may happen at every skew timer time out. After receiving the skew timer signal, the APDC-U module 302 may provide the calculated uplink delay to the DG-U module 310. Moreover, the APDC-U module 302 may continue to provide the uplink delay to the DG-U module 310 for each of the AWP. The uplink delay may be provided to the DG-U module 310, until the APDC-U module 302 may not receive the SEV generation signal indication from the SC module 316. In an embodiment, the SEV generation signal indication may be generated when the skew detect check passes for that particular AWP. However, after receiving the SEV generation signal indication, the APDC-U module 302 may stop sending the uplink delay to the DG-U module 310 until a new skew timer signal is received from the SC module 316.

The APDC-D module 304 may accumulate the timestamps T1 and T2 from the PTP-d module 204 for the pre-defined accumulator time window. The pre-defined time window may correspond to the AWP. Additionally, the pre-defined accumulator time window may be preconfigured by the user. The APDC-D 304 module may then calculate the downlink delay based on at least two packet transactions at end of each of the AWP. For calculating the downlink delay, the APDC-D module 304 may determine an accumulated timestamp value [T1(AWP)] and an accumulated timestamp value [T2(AWP based on at least two packet transactions. The accumulated timestamp value [T1(AWP)] may be determined based on an accumulated T1 value over the AWP, divided by total T1 timestamps that may happen during that AWP. Similarly, the accumulated timestamp value [T2(AWP)] may be determined based on an accumulated T2 value over the AWP, divided by total T2 timestamps that may happen during that AWP. In reference to FIG. 1, the accumulated timestamp value [T1(AWP)] and [T2(AWP)] may correspond to the timestamps T1 and T2. Based on the accumulated timestamp value [T1(AWP)] and the accumulated timestamp value [T2(AWP)], the APDC-D module 304 may calculate the downlink delay, as represented by an equation (2) below:

$$\text{Downlink Delay}(DPD)=[T2(AWP)]-[T1(AWP)] \quad (2)$$

The APDC-D module 304 may then update its internal register (i.e. the RR-D module 308) based on the downlink delay calculated. In addition, the APDC-D module 304 may receive a skew timer signal from the STR module 314. The skew timer signal may happen after every skew period. In an embodiment, the skew timer signal may happen at every skew timer time out. After receiving the skew timer signal, the APDC-D module 304 may provide the calculated downlink delay to the DG-D module 312. Moreover, the APDC-D module 304 may continue to provide the uplink delay to the DG-D module 312 for each of the AWP. The downlink delay may be provided to the DG-D module 312, until the APDC-D module 304 may not receive the SEV generation signal indication from the SC module 316. In an embodiment, the SEV generation signal indication may be generated when the skew detect check passes for that particular AWP. However, after receiving the SEV generation signal indication, the APDC-D module 304 may stop sending the downlink delay to the DG-D module 312 until a new skew timer signal is received from the SC module 316.

The RR-U module 306 may act as a storage register for a reference uplink delay (UPD-R). The UPD-R may be stored by the DG-U module 310. The UPD-R may correspond to a first pre-defined accumulator time window at the start of the slave device 104, or to a last pre-defined accumulator time window during a previous correction of the clock skew. By way of an example, the UPD-R may be a previous uplink delay that may be stored in the RR-U module 306, by the DG-U module 310. It should be noted that, during the start of the slave device 104, the UPD-R may be the first uplink delay determined for the pre-defined accumulator time window.

The RR-D module 308 may act as a storage register for a reference downlink delay (DPD-R). The DPD-R may be stored by the DG-D module 312. The DPD-R may correspond to a first pre-defined time window at a start of the slave device 104, or to a last pre-defined accumulator time window during a previous correction of the clock skew. By way of an example, the DPD-R may be a previous downlink delay that may be stored in the RR-D module 308, by the DG-D module 312. It should be noted that, during the start of the slave device 104, the DPD-R may be the first downlink delay determined for the pre-defined accumulator time window.

The DG-U module 310 may trigger its operations on receiving the skew timer signal from the STR module 314. Thereafter, for each of the uplink delay received from the APDC-U module 302, the DG-U module 310 may perform following operations: the DG-U module 310 may read the UPD-R from the RR-U module 306. It should be noted that, initially, (i.e., during start of the PTP packet transaction) a reference value of the UPD-R may not exist in the RR-U module 306. Therefore, a first value received for the uplink delay may be set as an initial reference value of the UPD-R, in the RR-U module 306. In reference to FIG. 1b, the initial reference value may correspond to the first reference uplink delay. Thereafter, the DG-U module 310 may wait for a next value of the uplink delay to be received from the APDC-U module 302. After receiving the next value of the uplink delay, the DG-U module 310 compare the next value of the uplink delay received from the APDC-U module 302 with the initial reference value stored in the RR-U module 306. Moreover, if the next value received of the uplink delay is not equal to the value of the UPD-R, then the change in the uplink delay is determined based on an equation (3) given below:

$$UPD\text{-}d=(UPD)-(UPD\text{-}R) \quad (3)$$

In equation (3), the UPD-d represents the change in the uplink delay. The UPD represents the next value received of the uplink delay. The UPD-R represents the initial reference value of the reference uplink delay. In an embodiment, the change in the uplink delay may also be referred as the delta uplink delay. In addition, the change in the uplink delay may correspond to a deviation that may happen, since the last SEV generation signal indication. Thereafter, the determined change in the uplink delay i.e., UPD-d is provided to the SC module 316 for further processing. Additionally, on receiving the SEV generation signal indication from the SG module 318, the DG-U module 310 may update the RR-U module 306 with recent value of the uplink delay received from the APDC-U module 302. Thereafter, the DG-U module 310 may stop all its operations until it may receive a next skew timer signal.

The DG-D module 312 may trigger its operations on receiving the skew timer signal from the STR module 314. Thereafter, for each of the downlink delay received from the APDC-D module 304, the DG-D module 312 may perform following operations: the DG-D module 312 may read the DPD-R from the RR-D module 308. It should be noted that, initially, (i.e., during start of the PTP packet transactions) a reference value of the DPD-R may not exist in the RR-D module 308. Therefore, a first value received for the downlink delay may be set as an initial reference value of the DPD-R, in the RR-D module 308. In reference to FIG. 1b, the initial reference value may correspond to the first reference downlink delay. Thereafter, the DG-D module 312 may wait for a next value of the downlink delay to be received from the APDC-D module 304. After receiving the next value of the downlink delay, the DG-D module 312 may compare the next value of the downlink delay received from the APDC-D module 304 with the initial reference value of the downlink delay stored in the RR-D module 308. Moreover, if the next value of the downlink delay is not equal to the value of the DPD-R, then the change in the downlink delay is determined based on an equation (4) given below:

$$DPD\text{-}d=(DPD)-(DPD\text{-}R) \quad (4)$$

In equation (4), the DPD-d represents the change in the downlink delay. DPD represents the next value received of the downlink delay. DPD-R represents the initial reference value of the reference downlink delay. In an embodiment, the change in the downlink delay may also be referred as the delta downlink delay. In addition, the change in the downlink delay may correspond to a clock deviation that may happen, since the last SEV generation signal indication. Thereafter, the determined change in the downlink delay i.e., DPD-d is provided to the SC module 316 for further processing. Additionally, on receiving the SEV generation signal indication from the SG module 318, the DG-D module 312 may update the RR-D module 308 with recent value of the downlink delay received from the APDC-D module 304. Thereafter, the DG-D module 312 may stop all its operations until it may receive a next skew timer signal.

The STR module 314 includes a timer to generate the skew timer signal externally. The skew timer signal may be generated when a pre-configured time period (i.e., pre-defined/pre-determined skew period corresponding to pre-defined skew time window) in register of the STR module 314 has timed out. The STR module 314 may store the pre-defined time period that may be determined and configured by a user based on specification provided by the clock vendor (manufacturer). As stated above, the skew period configured by the user may correspond to a minimum period required to detect the clock skew of the clock of the slave device 104. In addition, the skew period configured by the user may be based on a quality (accuracy) of the clock of the slave device 104 as defined in the specification provided by the clock vendor (manufacturer). Moreover, the quality of the clock may be specific to a particular clock and may vary from clock to clock. As will be appreciated, a default value for the skew period may be configured as per the clock accuracy in parts per billion per day i.e., PPB/100 that may be converted into nanoseconds. By way of an example, if a clock accuracy is specified to be 50 PPB/24 hours as per clock specification provided by the clock vendor (manufacturer), then the skew period may correspond to a time required for 0.5 PPB change. The time required for 0.5 PPB change may be 0.24 hours or 14.4 minutes. The default value for the skew period may be 1% of the clock accuracy period for a specified deviation that may happen as per the clock accuracy, considering a linear deviation of the clock during that time period. The default value configured may be a sufficient time that must considered prior to the skew detection check to detect a noticeable clock skew. However, in some embodiments, the user may modify the default value based on specific environment condition.

The SC module 316 may read the change in the uplink delay, i.e., UPD-d and the change in the downlink delay, i.e., DPD-d from the DG-U module 310 and the DG-D module 312 respectively. The SC module 316 may then determine a minimum skew threshold (MST). The MST value may be determined by calculating a difference in average of the change in uplink delay and the change in downlink delay, and one of the change in the uplink delay and the change in the downlink delay. Moreover, the MST value determined may be a modulus value i.e., a non-negative value. An equation (5) given below represents the calculation required to determine the MST:

$$MST = MOD|(DPD\text{-}d + UPD\text{-}d)/2 - DPD\text{-}d| \quad (5)$$

The SC module 316 may calculate 10% of the DPD-d, i.e., 0.1 DPD-d. It should be noted that, 10% of the DPD-d may be a pre-defined percentage value and other pre-defined percentage value may be well within the scope of the present invention. Moreover, if the MST is below 0.1 DPD-d then the change in the uplink delay and the change in the downlink delay is about same. In addition, when the change in the uplink delay and the change in the downlink delay is about same, then the SC module 316 may provide the change in the downlink delay as the clock skew value (i.e., the SEV) to the SG module 318. In an embodiment, the change in the downlink delay may be provide to the correction applier and DAC module 208 from the SCG module 206.

The SG module 318 may generate signal indication corresponding to the clock skew value generated by the SC module 316. In an embodiment, the SG module 318 may generate signal indication towards both APDC modules i.e., the APDC-U module 302 and the APDC-D module 304. The SG module 318 may also generate signal indication for the DG-U module 310 and the DG-D module 312.

Figure 4:
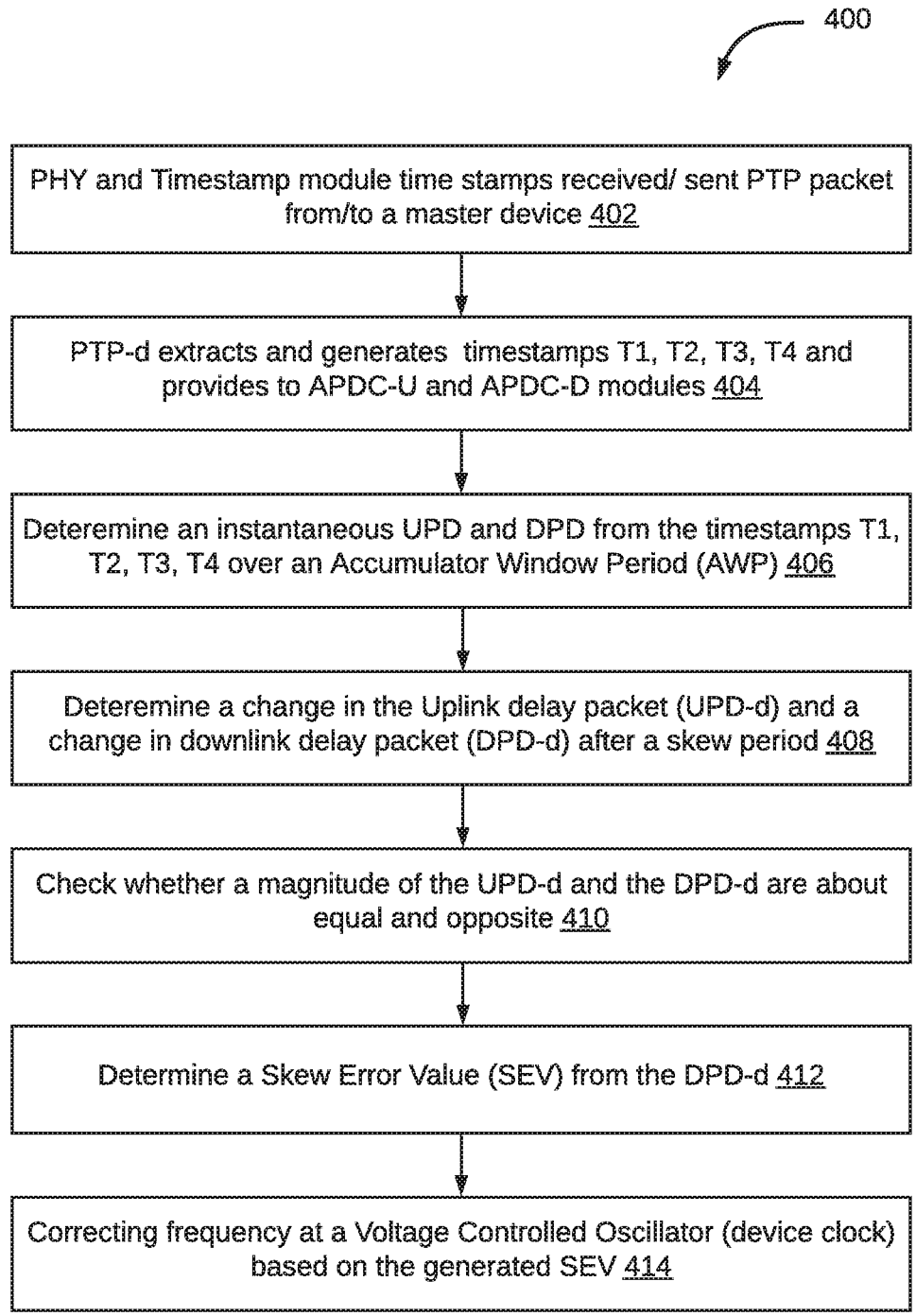
FIG. 4 is a flow diagram of an exemplary process overview for correcting a clock skew of a clock in a slave device using PTP, in accordance with some embodiments of the present disclosure.

Referring now to FIG. 4, a flow diagram of an exemplary process overview for correcting a clock skew of a clock in a slave device using PTP is depicted via flowchart, in accordance with some embodiments of the present disclosure. At step 402, the timestamp may be determined for each of the PTP packet send from the master device 102 and received at the slave device 104 within the pre-defined accumulator window. It should be noted that the timestamp may be determined as per IEEE 1588v2 standard towards the master device 102. The timestamp T1 may be generated for the sync packets sent from the master device 102. The timestamp T2 may be generated when the sync packets sent is received at the slave device 104. Thereafter, the slave device 102 may generate the timestamp T3 by sending the delay request packets. Based on the delay request packets, the master device 102 may send the delay response packet for corresponding to the received delay request packets and thereby generating the timestamp T4. It should be noted that, the timestamps T1, T2, T3 and T4 generated may correspond to the accumulated timestamp values T1(AWP), T2(AWP), T3(AWP) and T4(AWP) respectively. The timestamp T1, T2, T3 and T4 may be sent to the PTP-d module 204. Additionally, the timestamps T1, T2, T3 and T4 may be generated by the PHY and timestamp module 202. At step 404, the PTP-d module 104 may extract the timestamps T1, T2, T3 and T4. Thereafter, the PTP-d module 204 may provide the timestamp T1 and T2 to the APDC-D module 304 and T3 and T4 to the APDC-U module 302. As will be appreciated, any existing or open source implementation for the PTP-d module 204 may be used to extract the timestamps T1, T2, T3 and T4 from PTP message packets. It should be noted that, each of the PTP message packet may contain information about the timestamps T1, T2, T3, and T4 for each of the PTP packet transactions. At step 406, the uplink delay and the downlink delay may be determined based of the timestamps T1, T2, T3 and T4 generated for at least two packet transactions within the pre-defined accumulator time window. The pre-defined time window may correspond to the accumulation window period (AWP). In an embodiment, the uplink and the downlink delay may also be referred as an instantaneous uplink packet delay and an instantaneous downlink delay. In addition, the uplink delay and the downlink delay may be determined based on equation (1) and (2) respectively.

At step 408, the change in the uplink delay and the change in the downlink delay may be determined based on the skew timer signal generated after the skew period. Moreover, the change in the uplink delay and the downlink delay may be determined only when the skew detection check passes. As will be appreciated, the change in the uplink delay and the downlink delay may be determined based on equation (3) and (4). At step 410, a magnitude of the change in the uplink delay and the downlink delay may be determined based on the MST. The MST may be determined based on the equation (5). Moreover, the magnitude of the change in the uplink delay may be about same as the change in the downlink delay and may be in opposite direction. Thereafter, at step 412, the clock skew value may be determined based on the change in the downlink delay. The clock skew value may correspond to the SEV. The clock skew value may be determined based on the detected clock skew that may happen after the skew period for a specific clock period (i.e., the pre-defined accumulator window period). In addition, the change in the downlink delay may be considered for determining the clock skew value, as the change in downlink delay, both in magnitude and direction may directly correspond to a correction that may be required at the slave clock and VCO 210. The correction may correspond to the frequency change that may be required to be adjusted at the clock of the slave device 104. At step 412, the correction (i.e., the frequency change) required at the clock of the slave device 104 may be determined based on the voltage generated. By way of an example, the frequency may be determined based on the voltage generated corresponding to the clock skew value. The correction determined may be provided as input to the slave clock (i.e., the VCO 210).

Figure 5:
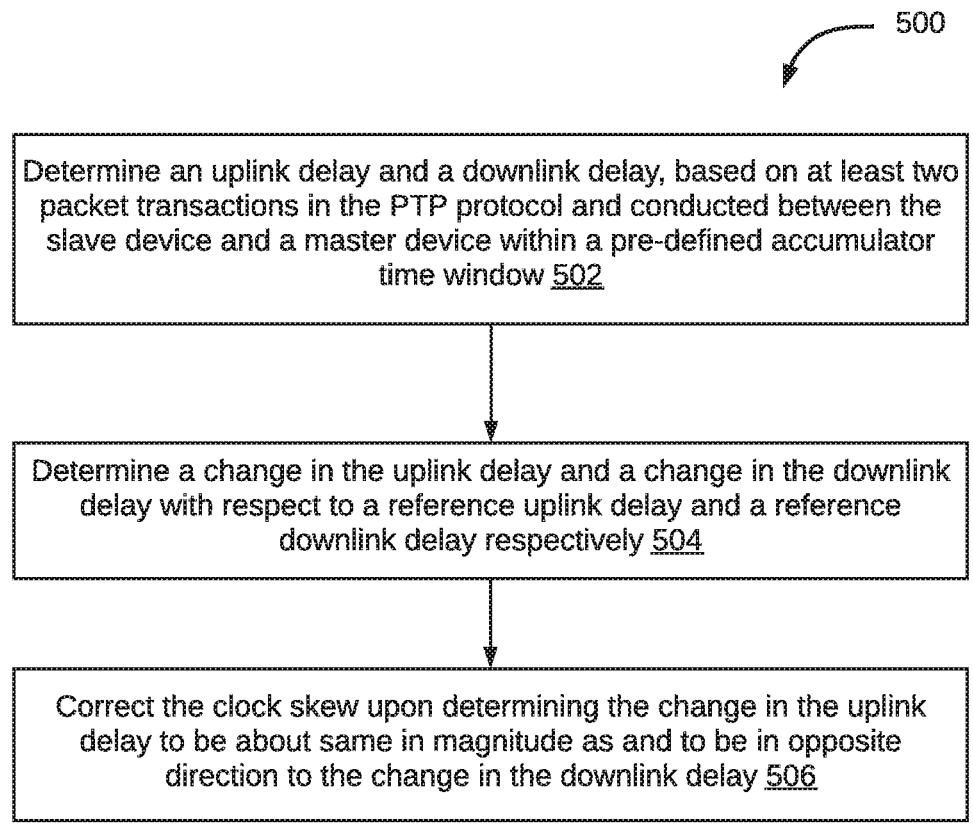
FIG. 5 is a flow diagram of an exemplary process for correcting a clock skew of a clock in a slave device using PTP, in accordance with some embodiments of the present disclosure.

Referring now to FIG. 5, a flow diagram of an exemplary process for correcting a clock skew of a clock in a slave device using PTP is depicted via a flowchart, in accordance with some embodiments of the present disclosure. At step 502, an uplink delay and a downlink delay may be determined based on at least two packets transaction in the PTP protocol. The at least two packet transactions in the PTP protocol may be conducted between the master device 102 and the slave 104 within the pre-defined accumulator time window. The pre-defined accumulator time window may correspond to the AWP. As stated above, the uplink delay and the downlink delay may be based on the accumulated timestamp values (T1(AWP), T2(AWP), T3(AWP) and T4(AWP)) generated within the pre-defined accumulator time window. The equation (1) and equation (2) represents a technique that may be required to determine the uplink delay and downlink delay. At step 504, a change in the uplink delay and a change in the downlink delay may be determined based on the reference uplink delay and the reference downlink delay. The reference uplink delay and the reference downlink delay may correspond to a first pre-defined accumulator time window at a start of the slave device, or to a last pre-defined accumulator time window during a previous correction of the clock skew. In an embodiment, the change in the uplink delay may also be referred as the delta uplink delay. Similarly, the change in the downlink delay may also be referred as the delta downlink delay. The equation (3) and (4) represents a technique required to determine the change in the uplink delay and the change in the downlink delay. At step 506, the clock skew may be corrected based on the change in uplink delay and the change in the downlink delay. It should be noted that, in order to detect the clock skew, the magnitude of the change in the uplink delay and downlink delay must about equal and in opposite direction. The clock skew may be detected based on equation (5). In order to correct the clock skew, the clock skew value may be generated. Thereafter, based on the clock skew value the voltage may be generated. The generated voltage may be used to determine the frequency change that may be needed to be adjusted at the clock of the slave device, in order to correct the clock skew.

Figure 6:
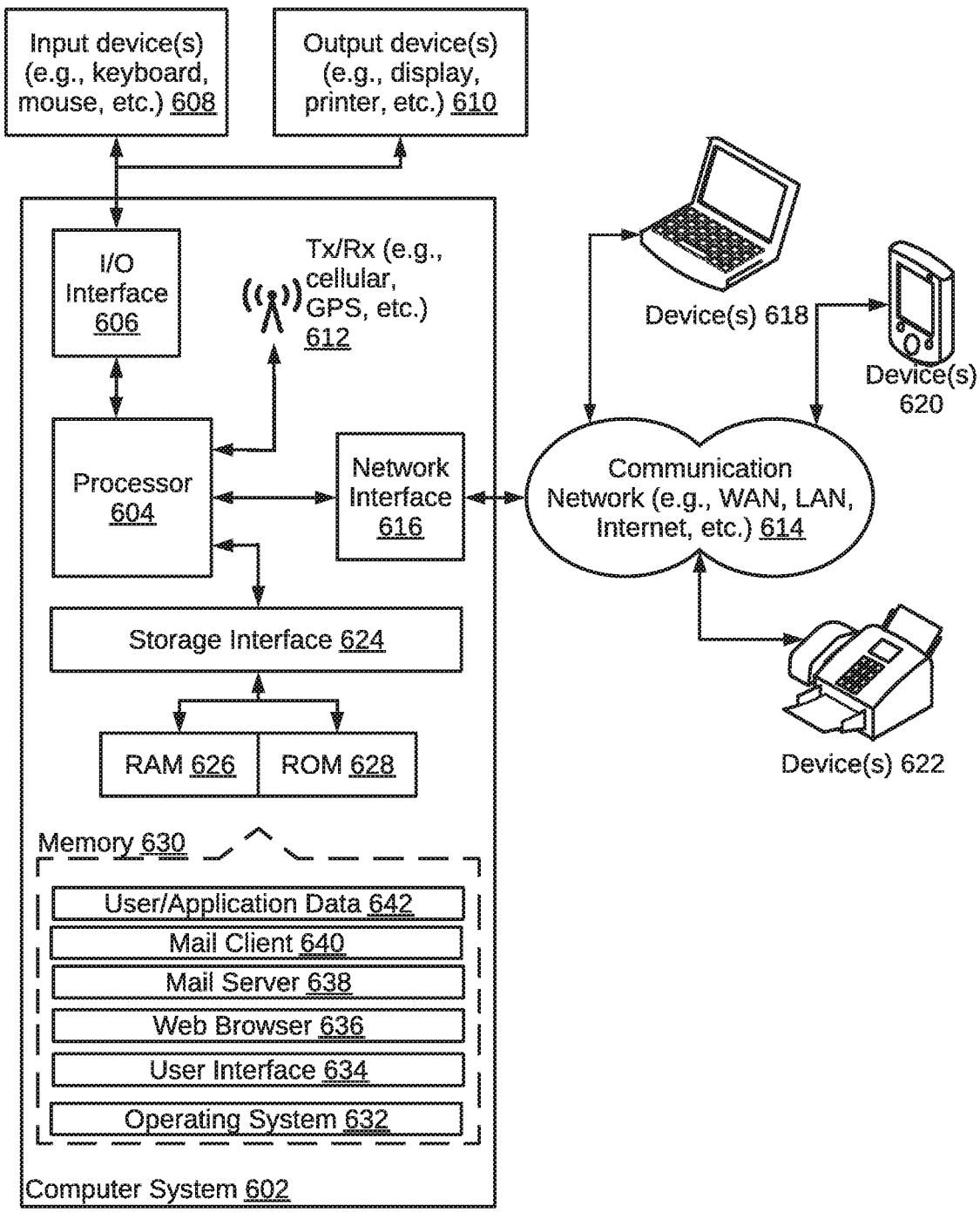
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 602 for implementing various embodiments consistent with the present disclosure is illustrated. Computer system 602 may include a central processing unit ("CPU" or "processor") 604. Processor 604 may include at least one data processor for executing program components for executing user or system-generated requests. A user may include a person, a person using a device such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 610 may be a printer, fax machine, video display (for example, cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (for example, using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 602 may itself embody one or more of these devices.

In some embodiments, processor 604 may be disposed in communication with one or more memory devices (for example, RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (for example, any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C #, MICROSOFT.NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL®, mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in various embodiments discussed above are not routine, or conventional, or well understood in the art. The techniques described in various embodiments discussed above provide for detecting a clock skew of a clock in a slave device using a precision time protocol (PTP). The techniques further determine the uplink delay and the downlink delay based on at least two packet transactions in the PTP protocol within the pre-defined time window. The techniques further determine the change in the uplink delay and the change in the downlink delay with respect to the reference uplink delay and the reference downlink delay respectively. The techniques further detect the clock skew based on the comparison between the change in the uplink delay and the change in the downlink delay. The techniques further synchronizing the clock of the slave device based on the clock skew value generated on detecting the clock skew.

In some embodiments, the techniques provide method and system for detecting a clock skew of a clock in a slave device using a precision time protocol (PTP). The techniques provided helps to detect the clock skew in a unique way, based on comparisons of the change in the uplink delay and the change in the downlink delay. The techniques provided helps dynamic levels control/filter in correction towards the clock of the slave device only if the clock skew is detected. This may, eliminate any disturbances that may be caused due to network variations. Further, the techniques provided is correction controlled and optimized based on accuracy of the clock of the slave device. The technique provided may prevent any unnecessary corrections that may increase the clock jitter. Further, the techniques provided is less complex and less CPU intensive as compared to an existing filtering mechanism based on various mathematical models. Example of the existing filtering mechanism may include, but is not limited to, a Kalman filter.

The specification has described method and system for detecting clock skew and synchronizing clock using precision time protocol (PTP). The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of correcting for a clock skew of a clock in a slave device using a precision time protocol (PTP), the method comprising:
   determining, by the slave device, an uplink delay and a downlink delay, based on at least two packet transactions in the PTP protocol and conducted between the slave device and a master device within a pre-defined accumulator time window;
   determining, by the slave device, a change in the uplink delay and a change in the downlink delay with respect to a reference uplink delay and a reference downlink delay respectively, wherein the reference uplink delay and the reference downlink delay correspond to a first pre-defined accumulator time window at a start of the slave device, or to a last pre-defined accumulator time window during a previous correction of the clock skew;
   performing, by the slave device, a skew detection check based on a comparison of a magnitude and a direction of the change in the uplink delay and the downlink delay, wherein the skew detection check indicates a positive detection when the change in the uplink delay is about same in magnitude as and is in opposite direction to the change in the downlink delay; and
   correcting, by the slave device, the clock skew when the skew detection check indicates the positive detection, wherein correcting the clock skew further comprises iteratively determining the change in the uplink delay and the change in the downlink delay within a next pre-defined accumulator time window, wherein the iteration is performed till the change in the uplink delay is about same in magnitude as and is in opposite direction to the change in the downlink delay.

2. The method of claim 1, wherein each of the at least two packet transactions comprises:
   receiving, by the slave device at a timestamp T2, a sync packet sent from the master device at a timestamp T1;
   sending, by the slave device at a timestamp T3, a delay request packet to the master device in response to the receiving of the sync packet; and
   receiving, by the slave device, a delay response packet sent from the master device in response to receiving of the delay request packet by the master device at a timestamp T4.

3. The method of claim 2, wherein the uplink delay is based on a difference of an accumulated T4 timestamp value [T4(AWP)] and an accumulated timestamp T3 value [T3(AWP)] of the at least two packet transactions, wherein the T4(AWP) is based on at least two T4 values corresponding to the at least two packet transactions, and wherein the T3(AWP) is based on at least two T3 values corresponding to the at least two packet transactions.

4. The method of claim 2, wherein the downlink delay is based on a difference of an accumulated T2 timestamp value [T2(AWP)] and an accumulated T1 timestamp value [T1(AWP)] of the at least two packet transactions, wherein the T2(AWP) is based on at least two T2 values corresponding to the at least two packet transactions, and wherein the T1

(AWP) is based on at least two T1 values corresponding to the at least two packet transactions.

5. The method of claim 1, wherein determining the change in the uplink delay to be about same in magnitude as the change in the downlink delay comprises comparing a minimum skew threshold with a pre-defined percentage value of one of the change in the uplink delay and the change in the downlink delay, and wherein the minimum skew threshold is based on a difference between an average of the change in uplink delay and the change in downlink delay, and the one of the change in the uplink delay and the change in the downlink delay.

6. The method of claim 1, wherein correcting the clock skew comprises determining a clock skew value based on one of the change in the uplink delay and the change in the downlink delay.

7. The method of claim 6, wherein correcting the clock skew further comprises:
generating, by the slave device, a voltage based on the clock skew value; and
adjusting, by the slave device, a frequency of the clock based on the voltage.

8. The method of claim 1, further comprising iteratively correcting for the clock skew after a pre-defined skew time window, and wherein the pre-defined skew time window is configured based on an accuracy of the clock as defined by a specification of the clock.

9. A system for correcting for a clock skew of a clock in a slave device using a precision time protocol (PTP), the system comprising:
a slave device comprising a processor and a memory communicatively coupled to the processor, wherein the memory stores processor-executable instructions, which, on execution, causes the processor to:
determine an uplink delay and a downlink delay, based on at least two packet transactions in the PTP protocol and conducted between the slave device and a master device within a pre-defined accumulator time window;
determine a change in the uplink delay and a change in the downlink delay with respect to a reference uplink delay and a reference downlink delay respectively, wherein the reference uplink delay and the reference downlink delay correspond to a first pre-defined accumulator time window at a start of the slave device, or to a last pre-defined accumulator time window during a previous correction of the clock skew;
perform a skew detection check based on a comparison of a magnitude and a direction of the change in the uplink delay and the downlink delay, wherein the skew detection check indicates a positive detection when the change in the uplink delay is about same in magnitude as and is in opposite direction to the change in the downlink delay; and
correct the clock skew when the skew detection check indicates the positive detection, wherein correcting the clock skew further comprises iteratively determining the change in the uplink delay and the change in the downlink delay within a next pre-defined accumulator time window, wherein the iteration is performed till the change in the uplink delay is about same in magnitude as and is in opposite direction to the change in the downlink delay.

10. The system of claim 9, wherein each of the at least two packet transactions comprises:
receiving, at a timestamp T2, a sync packet sent from the master device at a timestamp T1;
sending, at a timestamp T3, a delay request packet to the master device in response to the receiving of the sync packet; and
receiving a delay response packet sent from the master device in response to receiving of the delay request packet by the master device at a timestamp T4.

11. The system of claim 10, wherein the uplink delay is based on a difference of an accumulated T4 timestamp value [T4(AWP)] and an accumulated timestamp T3 value [T3(AWP)] of the at least two packet transactions, wherein the T4(AWP) is based on at least two T4 values corresponding to the at least two packet transactions, and wherein the T3(AWP) is based on at least two T3 values corresponding to the at least two packet transactions.

12. The system of claim 10, wherein the downlink delay is based on a difference of an accumulated T2 timestamp value [T2(AWP)] and an accumulated T1 timestamp value [T1(AWP)] of the at least two packet transactions, wherein the T2(AWP) is based on at least two T2 values corresponding to the at least two packet transactions, and wherein the T1(AWP) is based on at least two T1 values corresponding to the at least two packet transactions.

13. The system of claim 9, wherein determining the change in the uplink delay to be about same in magnitude as the change in the downlink delay comprises comparing a minimum skew threshold with a pre-defined percentage value of one of the change in the uplink delay and the change in the downlink delay, and wherein the minimum skew threshold is based on a difference between an average of the change in uplink delay and the change in downlink delay, and the one of the change in the uplink delay and the change in the downlink delay.

14. The system of claim 9, wherein correcting the clock skew comprises determining a clock skew value based on one of the change in the uplink delay and the change in the downlink delay.

15. The system of claim 14, wherein correcting the clock skew further comprises:
generating a voltage based on the clock skew value; and
adjusting a frequency of the clock based on the voltage.

16. The system of claim 9, wherein the processor-executable instructions, on execution, further causes the processor to iteratively correct for the clock skew after a pre-defined skew time window, and wherein the pre-defined skew time window is configured based on an accuracy of the clock as defined by a specification of the clock.

17. A non-transitory computer-readable medium storing computer-executable instructions for:
determining an uplink delay and a downlink delay, based on at least two packet transactions in the PTP protocol and conducted between the slave device and a master device within a pre-defined accumulator time window;
determining a change in the uplink delay and a change in the downlink delay with respect to a reference uplink delay and a reference downlink delay respectively, wherein the reference uplink delay and the reference downlink delay correspond to a first pre-defined accumulator time window at a start of the slave device, or to a last pre-defined accumulator time window during a previous correction of the clock skew;
performing a skew detection check based on a comparison of a magnitude and a direction of the change in the uplink delay and the downlink delay, wherein the skew detection check indicates a positive detection when the change in the uplink delay is about same in magnitude as and is in opposite direction to the change in the downlink delay; and correcting the clock skew when the skew detection check indicates the positive detection, wherein correcting the clock skew further comprises iteratively determining the change in the uplink delay and the change in the downlink delay within a next pre-defined accumulator time window, wherein the iteration is performed till the change in the uplink delay is about same in magnitude as and is in opposite direction to the change in the downlink delay.

* * * * *